March 8, 1927.

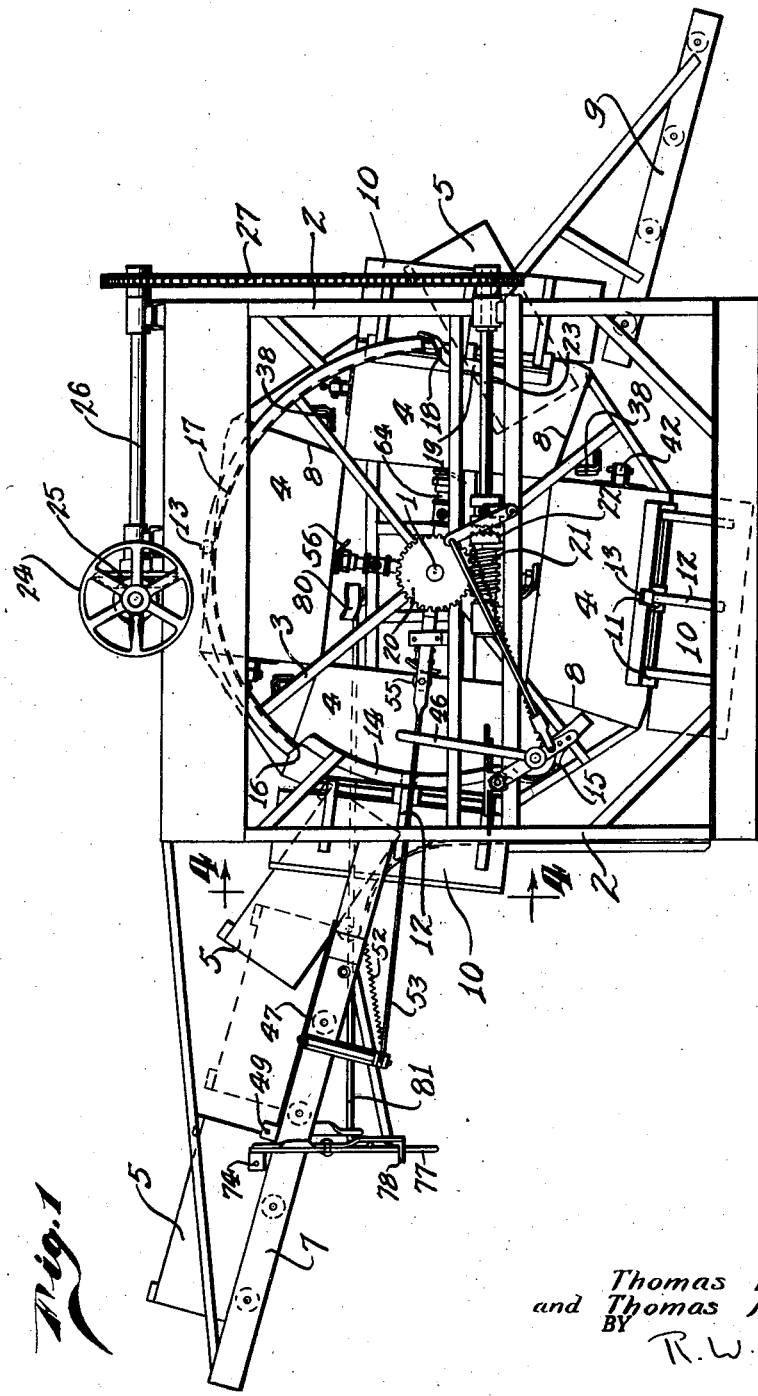

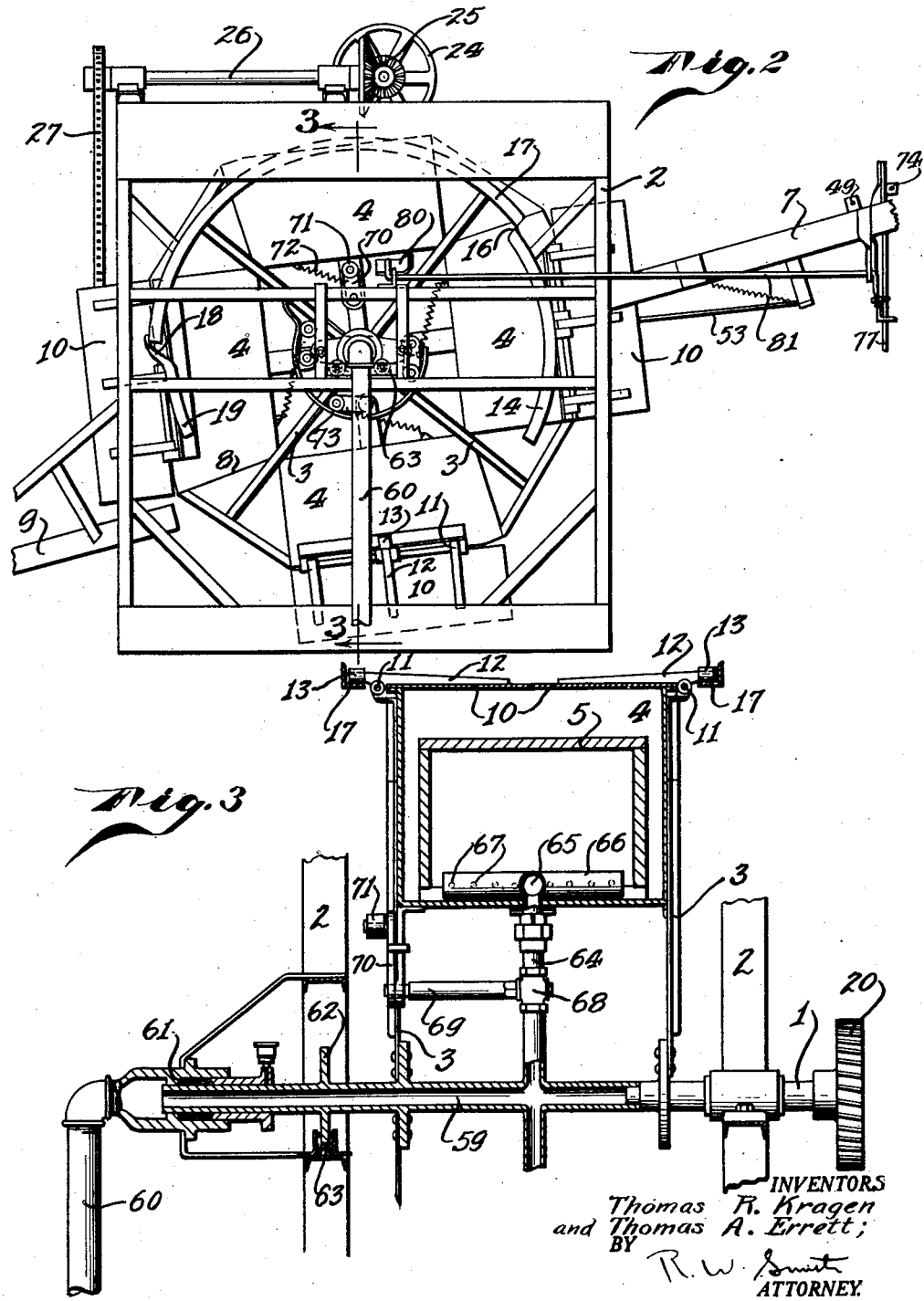

T. R. KRAGEN ET AL 1,620,360

STERILIZER

Filed July 30, 1924    5 Sheets-Sheet 3

INVENTORS
Thomas R. Kragen
and Thomas A. Errett;
BY R. W. Smith
ATTORNEY.

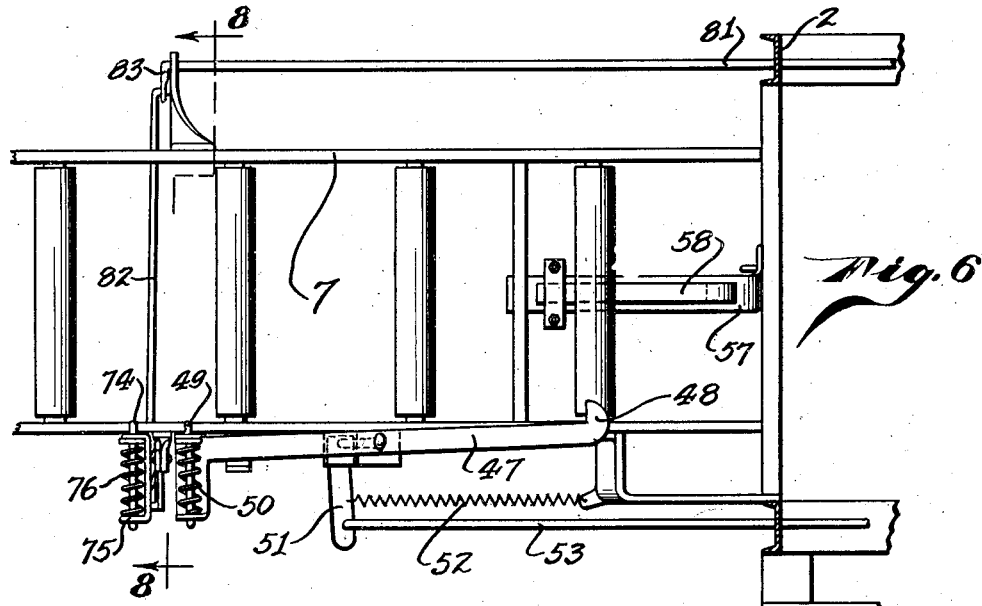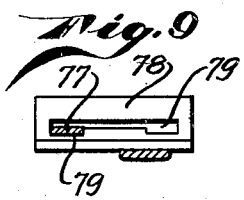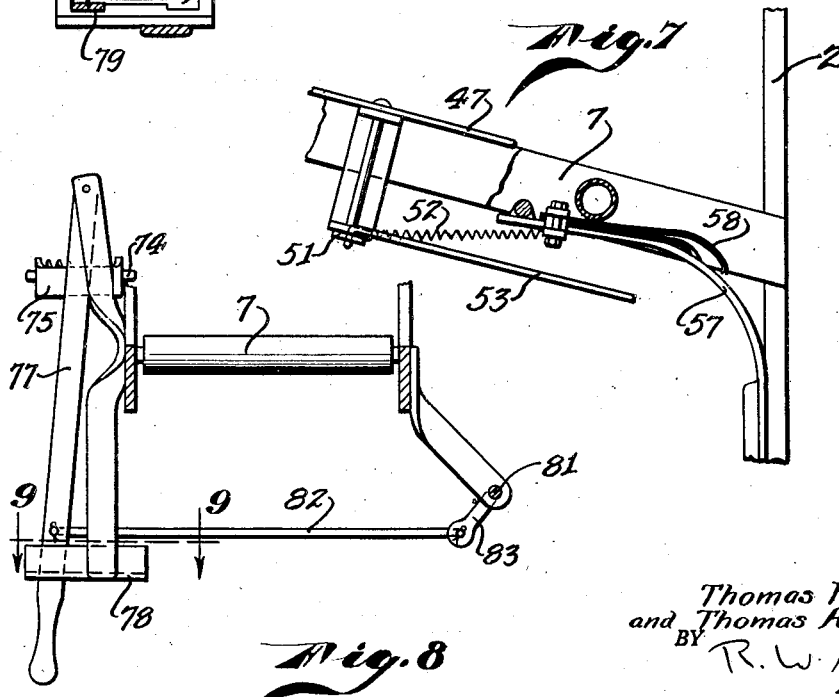

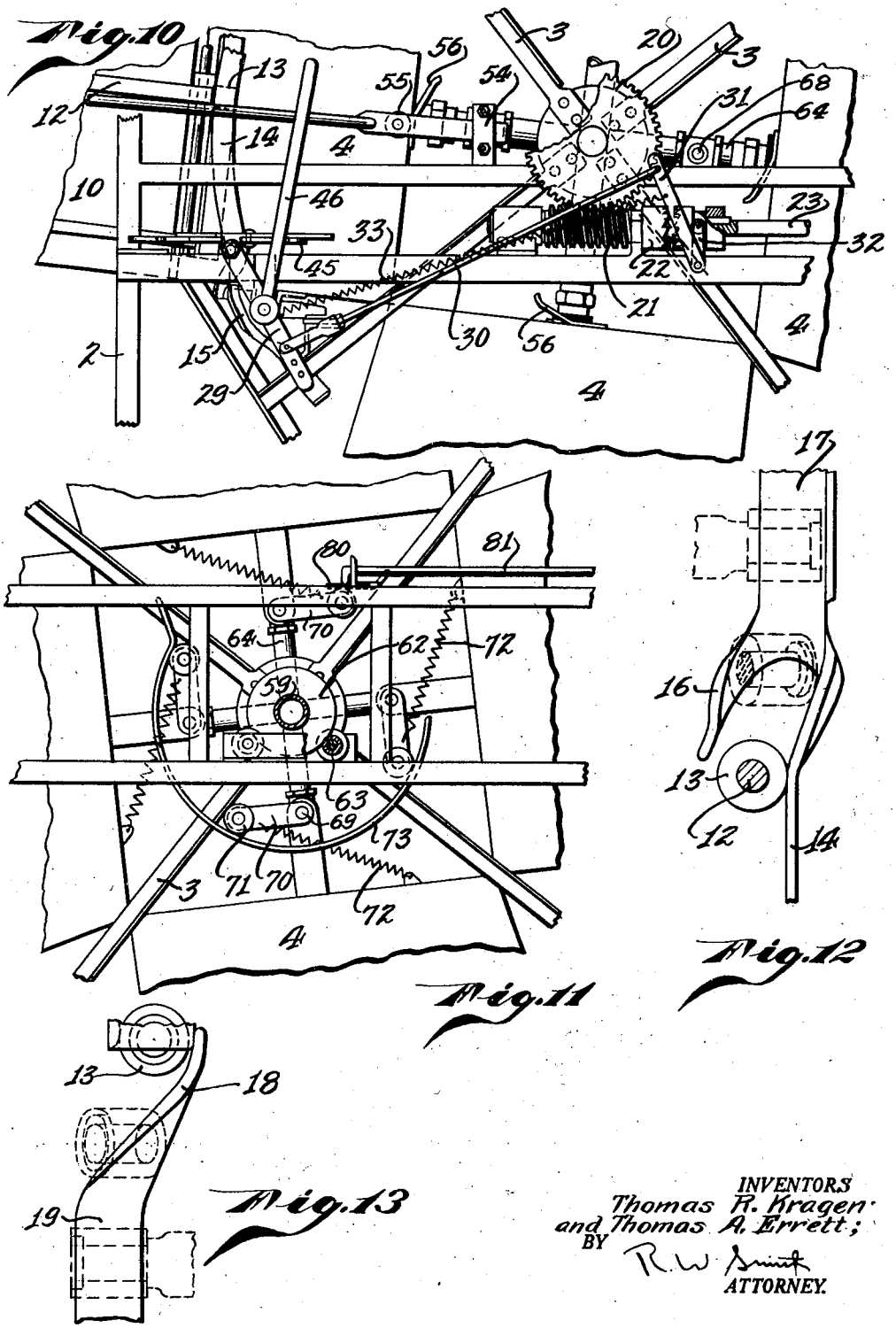

Patented Mar. 8, 1927.

1,620,360

UNITED STATES PATENT OFFICE.

THOMAS R. KRAGEN AND THOMAS A. ERRETT, OF LOS ANGELES, CALIFORNIA.

STERILIZER.

Application filed July 30, 1924. Serial No. 729,015.

This invention is a sterilizer particularly adapted for sterilizing boxes, such as the field boxes used in picking citrus fruit.

It is the object of the invention to successively feed the field boxes to receptacles in which they are subjected to a sterilizing medium such as steam, and then successively discharge the sterilized boxes, the entire operation of the machine being automatic and continuous as long as the boxes are supplied thereto.

It is a further object of the invention to provide for successively alining the sterilizing receptacles with the supply of boxes which are to be treated, and after momentarily stopping the receptacles to receive the boxes, to move said receptacles to a point of discharge while sterilizing the boxes contained therein, after which the empty receptacles are again alined with the source of supply.

It is a still further object of the invention to provide an automatic control for the operating mechanism, whereby the cycle of operation will be continued as long as boxes are supplied to the successive sterilizing receptacles, and will be automatically maintained in stopped position when the supply of boxes is discontinued.

It is a still further object of the invention to provide automatic means actuated by movement of the sterilizing receptacles from the source of supply to the point of discharge, for successively closing said receptacles, admitting the sterilizing medium thereto, shutting off said sterilizing medium, and opening said receptacles for discharge of the boxes.

It is a still further object of the invention to supply the boxes to the machine by a conveyor having control mechanism adapted to automatically release said boxes one at a time as the sterilizing receptacles successively stop in alinement therewith; and to provide manually controlled means for discontinuing the feeding of the boxes to the sterilizing receptacles and thereby stop the cycle of operation when the machine is to be shut down.

It is a still further object of the invention to mount a plurality of the sterilizing receptacles on the periphery of a rotatable drum, for successive alinement of said receptacles with the mechanism supplying the boxes as the drum rotates, and successive discharge of said boxes after sterilization thereof, as the receptacles move around to the opposite side of the rotating drum, the parts being so arranged that one receptacle is discharging as the opposite receptacle on the drum is in alinement to receive a box, in order that a continuous supply of boxes may be treated.

It is a still further object of the invention to provide an automatic control whereby stopping of the box supply and the consequent shutting down of the machine, will automatically shut off the sterilizing medium to the receptacle which is stopped in an intermediate position with said sterilizing medium being supplied thereto.

In the drawings:

Fig. 1 is a side elevation of the machine.

Fig. 2 is a similar view looking from the opposite side.

Fig. 3 is a section on the line 3—3 of Fig. 2.

Fig. 6 is a plan view of the supply conveyor.

Fig. 7 is a side elevation of the same, partly broken away.

Fig. 8 is a section on the line 8—8 of Fig. 6.

Fig. 9 is a section on the line 9—9 of Fig. 8.

Fig. 10 is a detail side elevation of the clutch.

Fig. 11 is a detail side elevation of the opposite side of the machine, partly broken away, and showing the machine in stopped position.

Figs. 12 and 13 are detail views of the closing and opening cams controlling the doors of the sterilizing receptacles.

Figure 4:
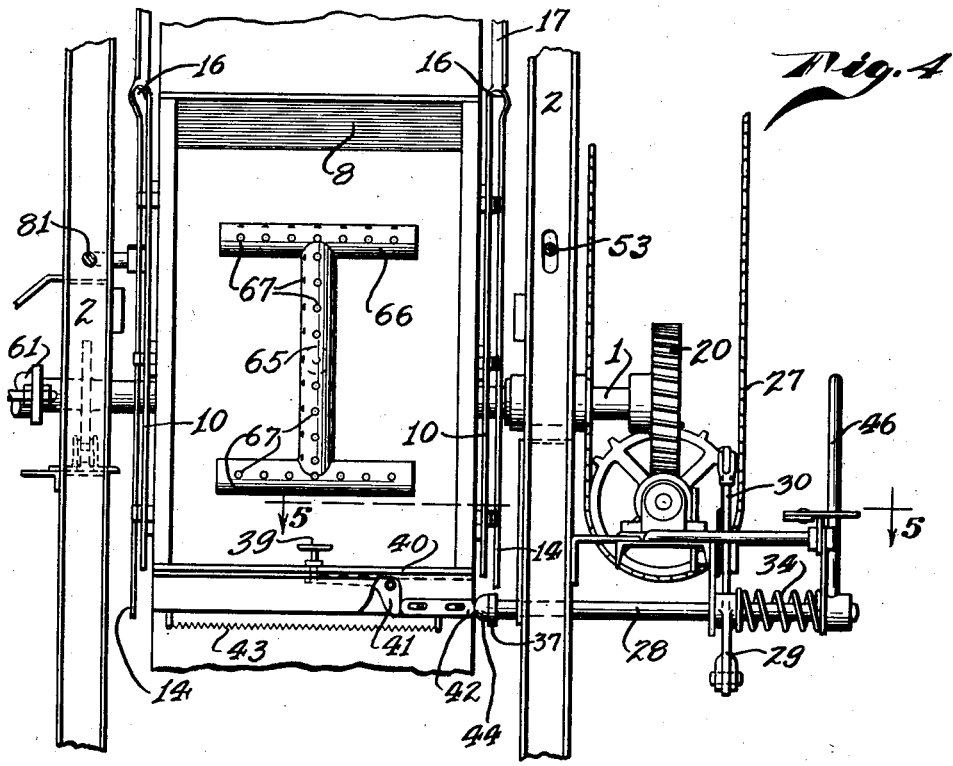
Fig. 4 is a section on the line 4—4 of Fig. 1.
Figure 5:
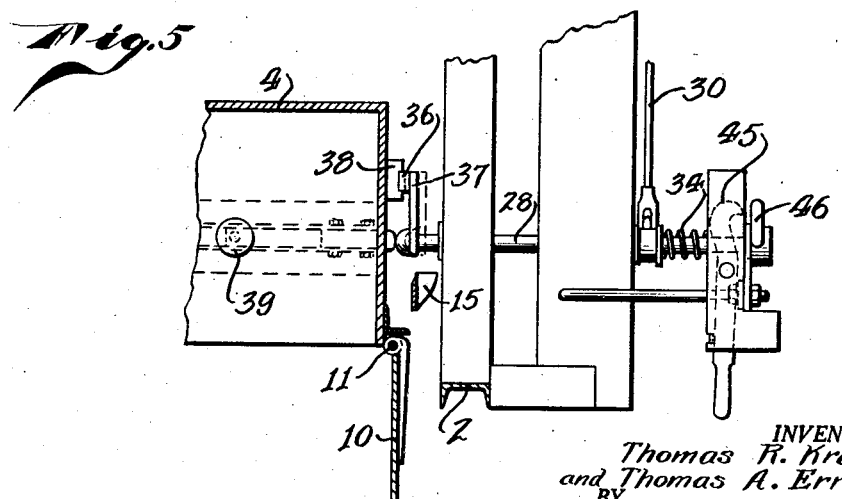
Fig. 5 is a section on the line 5—5 of Fig. 4.

The drum of the machine carrying the sterilizing receptacles is mounted in a main frame upon a horizontal axis, said drum comprising a shaft 1 journaled at its respective ends in transversely spaced rectangular side frames 2, which are suitably connected to form the main frame of the machine.

Arms 3 radiate from shaft 1 and support a plurality of sterilizing receptacles 4 between side frames 2 and circumferentially positioned one beyond another around the periphery of the drum. The receptacles are open at their sides forming the outer periphery of the drum and are adapted to each receive a usual field box 5 such as used in picking fruit.

The means for supplying the field boxes to the sterilizing receptacles comprises an inclined roller conveyor 7 mounted between side frames 2 at one side of the rotatable drum and slightly above the axis thereof, so that boxes 5 may slide down said conveyor, and tilt into the receptacles 4 which successively aline therewith during rotation of the drum in a clockwise direction in Fig. 1.

The field boxes are placed upon conveyor 7 with their open sides up, and tilt into receptacles 4 with their open sides against the bottoms of said receptacles as shown at the left of Fig. 1. The forward ends 8 of the receptacles, upon which the field boxes rest when the receptacles are moved around to the opposite side of the drum, are inclined downwardly and outwardly so that the boxes may tilt from said receptacles when the latter are in discharge position as shown at the right of Fig. 1. The boxes tilt onto withdrawal means shown as an inclined roller conveyor 9 positioned between side frames 2 below the axis of the rotatable drum.

Closure means are provided for the open sides of receptacles 4, and during rotation of the drum are automatically closed after a field box is tilted into a receptacle, and automatically open just prior to the discharge of said box at the opposite side of the drum.

In the present instance the closure means are shown as doors 10 hinged at 11 to the sides of the receptacles. The means for automatically opening and closing said doors preferably comprise extensions 12 of the hinge plates projecting outwardly beyond the axes of said hinges and having rollers 13 journaled thereon. These rollers engage trackways carried by side frames 2 and extending along the upper portion of the path of travel of receptacles 4. One end of said trackways extends below the point of alinement of receptacles 4 with supply conveyor 7, and the opposite end thereof terminates opposite the point of alinement of said receptacles with discharge conveyor 9.

The ends of the trackways at the supply side of the machine form bearing surfaces 14, so disposed that when engaged by rollers 13, the hinged doors 10 will be retained in the open position to which they have been swung by gravity during the lower portion of the cycle of movement of receptacles 4.

When in said open position, the doors at the side of the machine carrying the control mechanism are liable to strike the latter, and a cam 15 is therefore preferably provided in the trackway at that side of the machine, said cam being inclined so that when the rollers ride over the same the doors will be swung to partial closed position until they have moved beyond the control mechanism. The rollers will then again engage bearing surface 14 to swing the doors to full open position.

The bearing surfaces 14 continue along the trackways a sufficient distance to maintain doors 10 in open position until the field boxes are discharged from conveyor 7 into the receptacles 4, and at the ends of bearing surfaces 14 the rollers 13 engage cams 16 formed in the trackways. These cams are so inclined that engagement thereof by the rollers will swing the hinged doors 10 to closed position, and bearing surfaces 17 are formed in the trackways beyond cams 16 and are positioned to maintain the doors in closed position by the engagement of rollers 13 therewith.

The bearing surfaces 17 extend along the trackways to a point slightly in advance of the point of discharge of the field boxes onto conveyor 9, and said bearing surfaces terminate in cams 18 which are inclined so that engagement thereof by rollers 13 will swing doors 10 to open position.

Beyond cams 18 the trackways form bearing surfaces 19 extending to the end of the same, and so positioned that engagement thereof by the rollers will maintain the hinged doors in open position, to permit tilting of the field boxes from receptacles 4 onto conveyor 9.

The mechanism for rotating the drum having the sterilizing receptacles mounted thereon, is a power drive having a clutch control. As an instance of this arrangement a worm gear 20 may be mounted on shaft 1, said worm gear meshing with a worm 21 journaled on the frame of the machine and having a clutch connection 22 with a drive shaft 23. The drive shaft may be rotated from a pulley 24 preferably mounted on the top of the frame of the machine and driven from any suitable source of power. A speed reducing connection is preferably provided between the pulley and the drive shaft, and may include gearing 25 between said pulley and a shaft 26, and a sprocket chain connection 27 between shaft 26 and the drive shaft 23.

Clutch 22 is momentarily disengaged as each succeeding receptacle 4 moves into alinement with conveyor 7, and is automatically reengaged by a field box dropping into the alined receptacle, so that the cycle of operation will be continued as long as boxes are supplied to each succeeding receptacle, and the machine will be shut down whenever the supply of boxes is withheld.

As an instance of this arrangement clutch 22 may be controlled by a shaft 28 which is journaled on the main frame of the machine and is also adapted for slight axial movement. The operating connection between the shaft and the clutch preferably comprises an arm 29 fixed to said shaft and connected by a link 30 to a lever 31. The lever is pivoted on the main frame of the machine and has a yoke extension 32 engaging the shiftable member of clutch 22, for engaging or disengaging the latter as shaft 28 is turned in one direction or the other. A spring 33 connecting arm 29 and the frame of the machine is adapted to yieldably turn shaft 28 so as to maintain the clutch in engagement.

As each of the sterilizing receptacles move into alinement with conveyor 7, an operating connection turns shaft 28 against the action of spring 33 so as to disengage the clutch. For this purpose an abutment 36 is mounted on an arm 37 which is fixed on shaft 28, and cooperating abutments 38 are mounted on the rotatable drum adjacent the respective receptacles 4.

Shaft 28 is normally axially shifted by a spring 34 to position abutment 36 in the path of travel of abutments 38, and the latter successively engage abutment 36 as receptacles 4 successively aline with conveyor 7, thereby rocking arm 37 so as to turn shaft 28 against spring 33, and thus disengage clutch 22 for stopping rotation of the drum.

As soon as the drum is stopped, a field box 5 is discharged into the receptacle in alinement with conveyor 7, as will be hereinafter described, and clutch 22 is then automatically reengaged for turning the drum until the next following receptacle alines with the conveyor.

The means for reengaging the clutch comprises a plunger 39 mounted in each of the receptacles 4, said plunger being movable through a partition 40 in the end of the receptacle upon which the field boxes discharge from conveyor 7. Depression of said plunger by a box striking the same, actuates a bell crank lever 41 which is pivoted in the space below partition 40, and the movement of said lever projects a slide 42 beyond the side of the receptacle and against the action of a spring 43 normally retracting said slide.

Slide 42 when thus projected abuts against the head 44 of shaft 28, so as to retract said shaft against its spring 34, and thereby disengage cooperating abutments 36—38. As a consequence spring 33 will again turn shaft 28 so as to engage clutch 22, and the drum will be rotated until the next following receptacle 4 alines with conveyor 7.

Boxes 5 may be held against discharge into resceptacles 4 by mechanism to be hereinafter described, and when the supply of boxes is thus discontinued the clutch 22 will remain disengaged after abutment of members 36—38, to stop the operation of the machine. The machine may be locked in stationary position by a manually operated catch 45 engaging a hand lever 46 on shaft 28. To again start the machine catch 45 is released, and hand lever 46 is moved so as to retract shaft 28, thereby disengaging abutments 36—38 and permitting shaft 28 to be again turned by spring 33 so as to engage the clutch.

An automatic control on conveyor 7 is adapted to feed the field boxes 5 to the respective sterilizing receptacles. For this purpose a lever 47 is pivoted medially on the side of the conveyor, the front end of the lever forming a catch 48 adjacent the front end of the conveyor and adapted to be swung across the same in advance of the leading box moving down the conveyor. The rear end of the lever carries a plunger 49 yieldably projected by a spring 50, said plunger being adapted to be swung against the side of the box on the conveyor directly in rear of the leading box.

The lever 47 is yieldably held with catch 48 swung to operative position, and the opposite end of said lever which carries plunger 49 swung outwardly to inoperative position. The movement of a sterilizing receptacle 4 into alinement with conveyor 7, automatically turns the lever so as to disengage catch 48 and engage the plunger 49 with the second box upon the conveyor.

As a consequence the leading box is free to drop from the conveyor into receptacle 4, while the remainder of the boxes are held by plunger 49, and as soon as the leading box passes beyond catch 48, the lever is again yieldably swung to a position releasing the box held by plunger 49, so that said box may slide down to the end of the conveyor and be held by catch 48, which is returned to operative position by said return movement of the lever.

The operating connection for lever 47 comprises an arm 51 projecting laterally therefrom at its pivotal point, and connected by a spring 52 to the main frame of the machine so as to normally swing said lever for operation of catch 48.

An operating rod 53 is also connected to arm 51, the end of said rod sliding in a guide 54 on the main frame of the machine, and having a roller 55 journaled thereon. Cams 56 carried by the rotatable drum adjacent each of the receptacles 4, are adapted to engage roller 55 as the receptacles are successively alined with conveyor 7, in order to shift said roller and rod 53 on which it is mounted, in a direction to swing lever 47 against the tendency of spring 52, and thereby release catch 48 and engage plunger 49, for discharging a box 5 into each of the receptacles 4 as previously described.

In order to insure the discharge of the leading box on conveyor 7 into the alined receptacle 4 when catch 48 is released, the forward end of said conveyor preferably curves downwardly at a sharp angle as shown at 57; and in order to assist in tilting the box from the conveyor into the receptacle, spring fingers 58 are preferably mounted on the base of the curved end 57 of the conveyor.

These fingers are fixed to the conveyor at their rear ends and are free at their forward ends, so that a box passing over said fingers will depress the same until all but the rear end of said box is clear of said fingers, when the latter will flip the rear end of the box upwardly so as to tilt the same into the receptacle 4.

The field boxes in receptacles 4 are subjected to a sterilizing medium as the receptacles move from conveyor 7 to discharge conveyor 8, and during which time the doors 10 of the receptacles are closed as previously described.

For this purpose the end of shaft 1 which is remote from the drive mechanism is hollow so as to form a conduit 59 adapted for the passage of a sterilizing fluid, and said hollow end of the shaft is connected to a usual fluid conduit 60, through a stuffing box 61 permitting rotation of the shaft relative to the conduit while forming a leakproof joint.

The bearing for the hollow end of shaft 1 preferably comprises a relatively large disc 62 fixed on said shaft and rotatably supported by rollers 63 carried by the side frame 2 of the machine. By this arrangement the heat of the fluid passing through conduit 59, when steam or the like is used, will be radiated so as to prevent injury to the bearing.

Branch conduits 64 communicate with conduit 59 and radiate therefrom to the respective receptacles 4, said branch conduits entering said receptacles through the bottoms thereof and having nozzle heads 65 extending lengthwise of said receptacles and terminating in transverse nozzle heads 66 adjacent the ends of the receptacles. The nozzle heads are perforated at 67 for discharge of the sterilizing medium into receptacles 4.

As previously described, the field boxes 5 are received in receptacles 4 with their open tops against the bottoms of said receptacles, and nozzle heads 65 will therefore discharge directly into the boxes and into the cracks at the edges of the side walls thereof, and transverse nozzle heads 66 will be received in the ends of the boxes so as to discharge into the cracks at the edges of the end walls.

Valves 68 are provided in the respective branch conduits 64 and have operating shafts 69 projecting through the side of the rotatable drum which is remote from its drive mechanism. As the drum rotates, the shafts 69 are automatically turned for opening valves 68 just after the doors 10 of the corresponding receptacle 4 are closed, and are automatically turned in the opposite direction for closing the valves as the doors 10 are opened.

As an instance of this arrangement, lateral arms 70 may be fixed on shafts 69 with rollers 71 on the ends of said arms, the shafts being normally yieldably turned so as to open valves 68 by springs 72 connecting arms 70 and the frame of the drum.

A cam 73 is mounted on side frame 2 of the machine in the path of travel of rollers 71, said cam being positioned for initial engagement by a roller after the doors of the corresponding receptacle 4 are opened at the point of discharge onto conveyor 9. The engagement of roller 71 with the cam swings arm 70 against the action of spring 72 so as to turn shaft 69 for closing valve 68.

The cam is continuously engaged by the roller so as to maintain the valve in closed position during the lower portion of the cycle of movement of receptacles 4 and until doors 10 are again closed, at which point roller 71 passes beyond the end of the cam. The release of the roller permits spring 72 to again turn shaft 69 so as to open the valve, and the latter is held in open position by the spring, while the receptacles having the field boxes therein move around to the opposite side of the drum, at which point the doors 10 are again opened and the operation is repeated.

In the operation of the sterilizer as thus described, the discharge of boxes 5 from conveyer 7 into the sterilizing receptacles may be stopped at any time in order to automatically stop the rotation of the drum as previously described.

For this purpose a plunger 74 which is retracted during normal operation of the machine, is adapted to be manually shifted so as to engage the box on conveyor 7 which is directly in rear of the leading box, thereby holding the line of boxes against movement to the releasing catch 48.

Plunger 74 is slidably mounted in a frame 75 which is adapted to be shifted so as to move the plunger to either operative or inoperative position, and said plunger is preferably projected from its frame by a spring 76 so as to cause intimate engagement with a box 5 when the plunger is in operation.

The frame 75 may be shifted by a hand lever 77, and said lever is adapted to be held when swung in either direction, as by means of a guide plate 78 having the swinging end of the lever movable therethrough, and provided with spaced notches 79 adapted to engage said lever when the plunger 74 is shifted to operative or inoperative position.

When the machine is to be stopped lever 77 is swung so as to engage plunger 74 with the line of boxes on conveyor 7, and in order to again start the machine the lever is swung in the opposite direction so as to retract the plunger and permit advance of a box 5 until it abuts against catch 48. By then manually operating lever 46, the clutch 22 is again engaged to start rotation of the drum as previously described, and the movement of said drum for alining a receptacle 4 with the conveyor 7, will automatically release catch 48 to permit discharge of the leading box into said receptacle. The drum will then continue to rotate for successive discharge of the boxes into the sterilizing receptacles, until lever 77 is again manually shifted.

When the machine is stopped by manually operating said lever, the valve supplying the sterilizing medium to the receptacle 4 which is stopped at the top of the rotatable drum, as shown in Fig. 11, will be in open position, and means are therefore preferably provided for automatically closing said valve when the machine is stopped.

For this purpose a cam 80 is mounted on a rod 81 which is journaled on the main frame of the machine, said cam being adapted to be swung into or out of the path of travel of the roller 71 which is carried by the arm 70 controlling said valve. The cam is automatically moved to operative position just prior to the stopping of the rotation of the drum, and the engagement of roller 71 therewith is adapted to swing arm 70 against the action of spring 72 so as to close valve 68. When the machine is again started the cam 80 is again swung to inoperative position so that spring 72 may again open the valve.

The means for moving cam 80 into operative or inoperative position, when the machine is stopped or started, comprises a link 82 connecting lever 77 and a crank arm 83 on rod 81, so that said rod is turned in opposite directions by shifting of said lever to engage or disengage plunger 74.

We claim:

1. A sterilizer comprising a sterilizing receptacle, means for moving said receptacle from a point of supply to a point of discharge, and means for engaging the receptacle so that it is opened by its movement relative to the engaging means as it alines with the point of discharge.

2. A sterilizer comprising a sterilizing receptacle, means for moving said receptacle from a point of supply to a point of discharge and thence back to the point of supply, and means for engaging the receptacle so that it is closed by its movement relative to the engaging means between the point of supply and the point of discharge, and is maintained in open position by its movement relative to the engaging means between the point of discharge and the point of supply.

3. A sterilizer comprising a sterilizing receptacle, means for moving said receptacle from a point of supply to a point of discharge and thence back to the point of supply, a control for said moving means, closure means for said receptacle, and means for engaging said closure means so that it is moved to clear the control by movement of the receptacle relative to the engaging means and is then maintained in open position by its movement relative to the engaging means until the receptacle has moved beyond the point of supply and is then closed by its movement relative to the engaging means as the receptacle moves from the point of supply to the point of discharge.

4. A sterilizer comprising a plurality of sterilizing receptacles, a power driving connection for moving said receptacles from a point of supply to a point of discharge and thence back to the point of supply so that said receptacles will successively aline with the point of supply as other of said receptacles successively aline with the point of discharge, and means controlled by the movement of said receptacles for automatically successively disengaging said driving connection as each successive receptacle is so alined.

5. A sterilizer comprising a sterilizing receptacle, a power driving connection for moving the same from a point of supply to a point of discharge and thence back to the point of supply, means for disengaging the driving connection by movement of the receptacle so as to stop the receptacle in alinement with the point of supply and means controlled by the movement of said receptacle for feeding articles thereto one at a time upon successive stopping of the receptacle in alinement with the source of supply.

6. A sterilizer comprising a sterilizing receptacle, means for supplying articles to said receptacle, means for moving said receptacle from point of supply to a point of discharge, and resilient means beneath said articles adapted to push upwardly upon the rear ends thereof for tilting said articles into said receptacle.

7. A sterilizer comprising a frame, a conduit having a relatively large bearing disc fixed thereon, said bearing disc being journaled on said frame to form a bearing for said conduit relative to said frame, a sterilizing receptacle mounted on said conduit for rotation therewith from a point of supply to a point of discharge, and means for supplying a sterilizing medium through said conduit to said receptacle.

8. A sterilizing receptacle having means in the bottom thereof for discharging a sterilizing medium into said receptacle, said discharge means comprising a perforated pipe extending longitudinally of said receptacle and transverse perforated pipes at the ends thereof, and means for introducing a box having an open top into said receptacle with its open top against the bottom of said receptacle and overlying said perforated pipes.

9. A sterilizer comprising a plurality of sterilizing receptacles, means for successively moving said receptacles from a point of supply to a point of discharge and thence back to the point of supply, means controlled by the movement of said receptacles for introducing a sterilizing medium thereto between the point of supply and the point of discharge, means for stopping the movement of said receptacles, and means controlled thereby for shutting off said sterilizing medium to all of the receptacles between the point of supply and the point of discharge.

10. A sterilizer comprising a sterilizing receptacle, means for moving said receptacle from a point of supply to a point of discharge, means for controlling movement of the receptacle by the supplying of articles thereto, means controlled by the movement of said receptacle for closing the same between the point of supply and the point of discharge, and means controlled by the movement of the receptacle for introducing a sterilizing medium into said receptacle while the same is closed.

11. A sterilizer comprising a sterilizing receptacle, means for moving the same from a point of supply to a point of discharge and thence back to the point of supply, a power driving connection for said moving means, means controlled by the movement of said receptacle for disengaging said driving connection and stopping the receptacle in alinement with said point of supply, and means actuated by the introduction of an article into said receptacle at said point of supply for again engaging said driving connection and starting the movement of said receptacle.

12. A sterilizer comprising a sterilizing receptacle, means for moving the same from a point of supply to a point of discharge and thence back to the point of supply, a power driving connection for said moving means, means controlled by the movement of said receptacle for disengaging said driving connection and stopping the receptacle in alinement with said point of supply, and means controlled by the movement of said receptacle into alinement with the point of supply for feeding articles thereto.

13. A sterilizer comprising a sterilizing receptacle, means for moving said receptacle from a point of supply to a point of discharge and thence back to the point of supply, a power driving connection for said moving means, means controlled by the movement of said receptacle into alinement with said point of supply for feeding articles thereto, and means actuated by the introduction of said articles into said receptacle for engaging said driving connection.

14. A sterilizer comprising a sterilizing receptacle, means for moving the same from a point of supply to a point of discharge and thence back to the point of supply, a power driving connection for said moving means, means controlled by the movement of said receptacle for disengaging said driving connection and stopping the receptacle in alinement with said point of supply, means controlled by the movement of said receptacle into alinement with the point of supply for feeding an article thereto, and means actuated by the introduction of said article for again starting the movement of said receptacle.

15. A sterilizer comprising a sterilizing receptacle, means for moving said receptacle from a point of supply to a point of discharge, means actuated by the introduction of an article into said receptacle at the point of supply for controlling the movement of said receptacle, and means controlled by the movement of said receptacle for closing the same between the point of supply and the point of discharge.

16. A sterilizer comprising a sterilizing receptacle, means for moving said receptacle from a point of supply to a point of discharge, a driving connection for said moving means, means actuated by the introduction of an article into said receptacle at said point of supply for engaging said driving connection, and means controlled by movement of the receptacle for introducing a sterilizing medium thereto during its movement from the point of supply to the point of discharge.

17. A sterilizer comprising a sterilizing receptacle, means for moving said receptacle from a point of supply to a point of discharge and thence back to the point of supply, means controlled by the movement of said receptacle for stopping the same in alinement with said point of supply, means controlled by the movement of said receptacle into alinement with the point of supply for feeding an article thereto, means actuated by the introduction of said article for again starting the movement of said receptacle, means controlled by the movement of said receptacle for closing the same between the point of supply and the point of discharge and opening the same at the point of discharge, and means controlled by the movement of said receptacle for introducing a sterilizing medium thereto while closed.

18. A sterilizer comprising a sterilizing receptacle, closure means for said receptacle, means for moving the receptacle from a point of supply to a point of discharge, means controlled by the movement of the receptacle for stopping the same in alinement with the point of discharge, and means controlled by movement of the receptacle into alinement with the point of discharge for opening said closure means.

In testimony whereof we have affixed our signatures to this specification.

THOMAS R. KRAGEN.
THOMAS A. ERRETT.